United States Patent [19]

Meyer

[11] Patent Number: 6,138,717
[45] Date of Patent: Oct. 31, 2000

[54] PLATE-SHAPED VALVE ARRANGEMENT

[75] Inventor: Ernst-August Meyer, Wennigsen, Germany

[73] Assignee: Mannesmann AG, Düsseldorf, Germany

[21] Appl. No.: 09/400,226

[22] Filed: Sep. 21, 1999

[30] Foreign Application Priority Data

Oct. 19, 1998 [DE] Germany .......................... 198 49 356

[51] Int. Cl.⁷ ................................................ F16K 31/124
[52] U.S. Cl. .................. 137/884; 137/454.6; 137/596.16
[58] Field of Search .................. 137/269, 271, 137/454.6, 884, 596.16, 560

[56] References Cited

U.S. PATENT DOCUMENTS

| | | | |
|---|---|---|---|
| 5,348,047 | 9/1994 | Stoll et al. ............................... | 137/554 |
| 5,699,830 | 12/1997 | Hayashi et al. .......................... | 137/554 |
| 5,918,629 | 7/1999 | Hayashi et al. .......................... | 137/560 |

OTHER PUBLICATIONS

Mannesmann Rexroth, specification "Ventileinheiten Typ V15", Apr. 1998, pp. 1–12.

*Primary Examiner*—John Fox
*Attorney, Agent, or Firm*—Cohen, Pontani, Lieberman & Pavane

[57] ABSTRACT

A plate-shaped valve arrangement has oppositely located connection surfaces and includes a baseplate element with at least two pressure medium channels and a valve element with pressure medium connections on at least one surface which is outfitted on at least one surface with corresponding pressure medium connections. An electrically controllable valve drive is arranged at a controlling narrow side which is freely accessible from the outside for selectively conveying a pressure medium between the pressure medium channels. A recess having at least two surfaces in the baseplate element cooperates in a corresponding manner with the valve element such that the pressure medium connections arranged on at least one surface of the recess are connected flush with the pressure medium connections of the valve element when the valve element is inserted. A multi-pin socket electrically connected to a control unit is arranged in the recess to cooperate in a corresponding manner with a connector arranged opposite thereto at the valve element, wherein the connector is electrically connected to the valve drive.

14 Claims, 3 Drawing Sheets

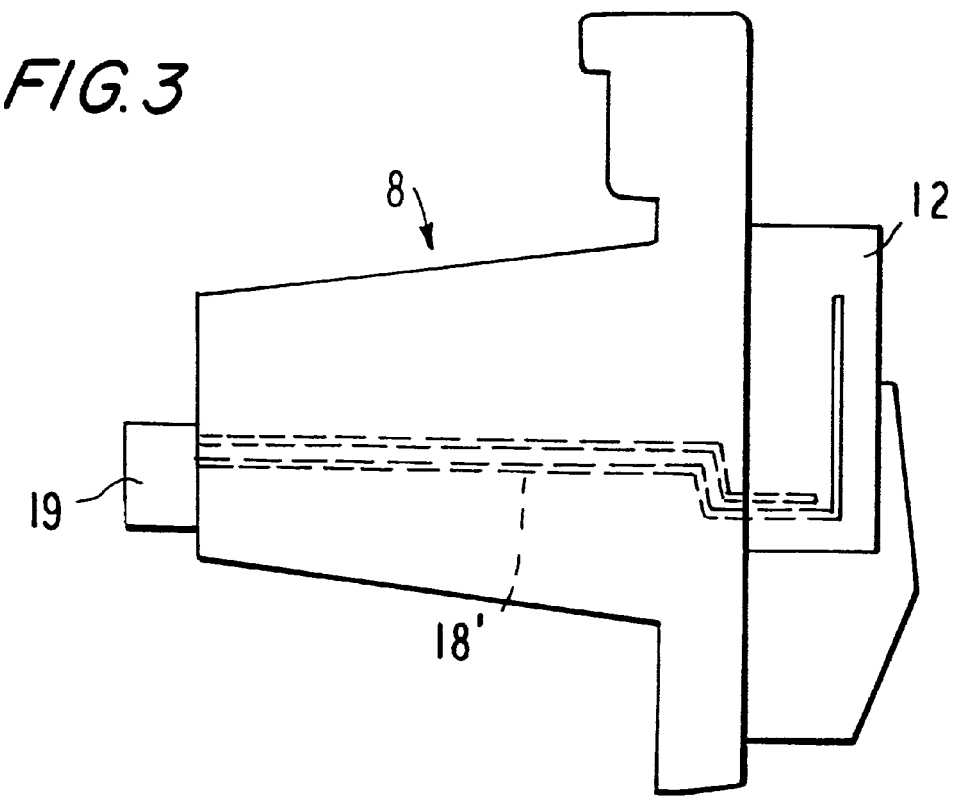
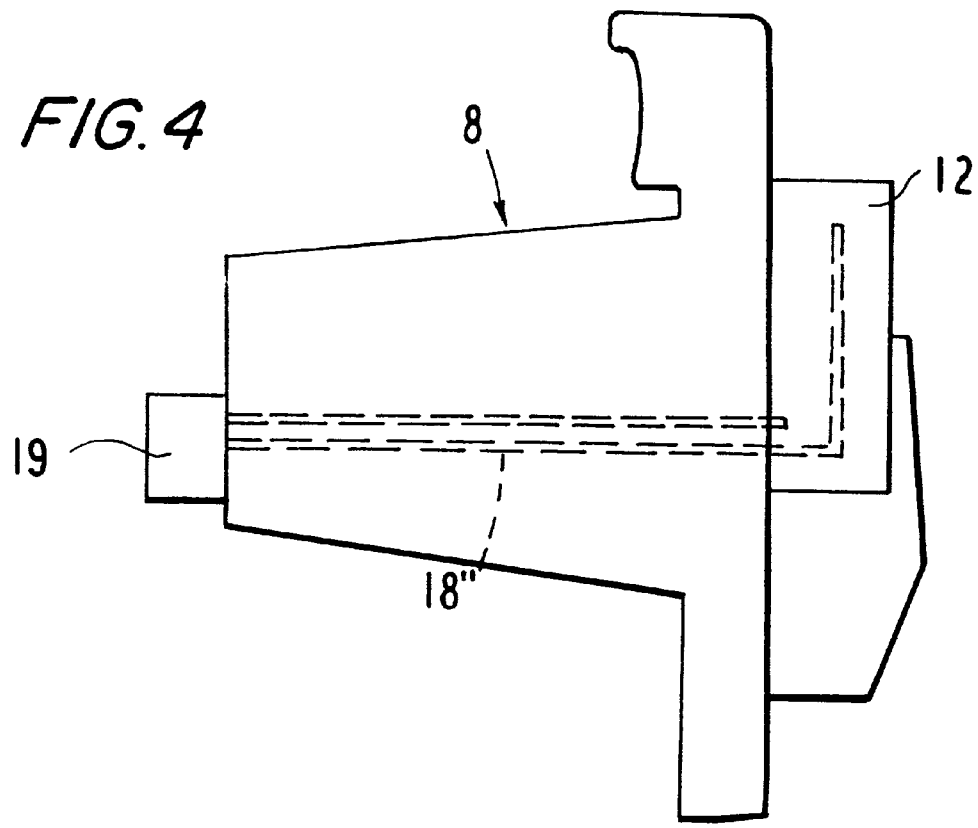

PLATE-SHAPED VALVE ARRANGEMENT

BACKGROUND OF THE INVENTION

1. Field of the Invention

The invention is directed to a plate-shaped valve arrangement including a base plate element and a valve element, the valve arrangement is insertable in a plug-in valve unit configured for receiving plural ones of the plate-shaped valve arrangement.

2. Description of the Related Art

A prior art plate-shaped valve arrangement is disclosed in the brochure titled "V15 Valve Units" by Rexroth Mecman GmbH (Document No. 8858903103, Printing Date April 1998). The pneumatic plate-shaped valve arrangement essentially comprises a valve element and a baseplate element. The valve element operates as a switching element for pressure medium flows and cooperates with a baseplate element containing pressure medium channels S, P, R, A, B. At two surfaces located opposite one another in the direction of flow, the valve element has corresponding pressure medium connections S, P, R and A, B, respectively. A position of a valve slide is movable between the pressure medium connections so as to selectively convey a pressure medium. For this purpose, the valve slide is moved via a valve drive in the form of an electropneumatic pilot valve which is freely accessible from the outside. The baseplate element has a U-shaped recess in which the valve element is inserted and locked. In this way, the pressure medium connections S, P, R, and A, B, respectively, of the valve element are aligned flush with the pressure medium connections S, P, R, A, B in the baseplate element by displacement along the surface. Pressure medium connections A, B for connecting working lines are provided externally on the baseplate element. The pressure medium channels S, P, R open into pressure medium channel portions which are arranged perpendicular to the base plate element.

The valve arrangement has a plate-like or disk-shaped configuration, wherein opposite connection surfaces allow a plurality of valve arrangements to be arranged in a row to form a valve unit. In this way, the individual pressure medium channel portions S, P, R combine to form common pressure medium channels S, P, R for all of the valve arrangements. The valve unit formed in this way may be fastened, for example, to a top hat rail by snap fasteners. Each individual valve drive has two electrical contact lugs for purposes of electrical connection to a controller. The individual valve drives are to be wired via corresponding plug-in contacts. The resulting laborious wiring disadvantageously increases assembly time of the valve unit. Furthermore, it is possible for the valve drives to be incorrectly wired. The external electrical lines do not conform to the trend toward the most compact possible construction.

SUMMARY OF THE INVENTION

It is an object of the present invention to further improve a valve arrangement of the type described above in such a way that assembly of the valve units built therefrom is facilitated, a high degree of compactness is achieved and a safe and reliable electrical connection is provided.

The object of the invention is achieved by a plate-shaped valve arrangement for insertion in a plug-in valve unit having a controller, the plate-shaped valve arrangement comprising a baseplate element having at least two pressure medium channels with a narrow bottom side connectable to the plug-in valve unit and a narrow top side, the base plate element having a recess open at the narrow top side and having a bottom end at the narrow bottom side of the base plate element, the recess having pressure medium connections in respective communication with the pressure medium channels and a multi-pin electrical socket arranged at the bottom end of the recess connectable to the controller of the plug-in valve unit, and a valve element having a first end insertable into the recess to a fully inserted position, pressure medium connections corresponding to and connectable with pressure medium connections on the recess when the valve element is in the fully inserted position, an electrically controllable valve drive connected at a second end of the valve element opposing the first end operable for selectively conveying a pressure medium through the valve between the at least two pressure medium channels, and a connector plug electrically connected to the valve drive and arranged at the first end of the valve element, said connector plug being mechanically and electrically connected with the socket when said valve element is in the fully inserted position.

The invention includes a plate-shaped valve arrangement including a base plate element and a valve element and further requires that the recess in the baseplate element at a second surface extending essentially perpendicular to the first surface provided with the pressure-medium connections has a multi-pin socket connectable to a control unit of the valve unit for electrically connecting the valve drive. The socket cooperates in a corresponding manner with a connector arranged opposite thereto at the valve element, wherein an electric connection in the valve element leads from the connector to the valve drive.

This arrangement completely eliminates the need for external free-hanging electrical lines proceeding from the valve element. The valve element according to the invention is connected both pneumatically and electrically with a single inserting movement which simplifies assembly. Furthermore, it is possible to exchange valve elements for repairs simply and quickly without the need to assemble or disassemble a pneumatic line or electrical line. In the invention, the electrical connection point of the valve element is shifted in a reliably contacting manner from the valve drive, which, just as before, is still externally accessible, to a point inside the valve arrangement where the possibility of a reversed polarity connection is also excluded owing to the compulsory contact brought about by the connector and socket. Apart from the resulting safe and reliable electrical connection, a valve unit formed of the valve arrangements according to the invention also achieves greater compactness due to the relocation of the wiring.

So that the pressure medium is guided in a straight line, which is favorable in terms of flow mechanics, the valve element is outfitted with pressure medium connections at two surfaces located opposite one another in the direction of flow, wherein a three-surface, U-shaped recess in the baseplate element cooperates in a corresponding manner with the valve element such that the pressure medium connections which are arranged opposite one another at two surfaces of the recess may be connected flush with the pressure medium connections of the valve element. In this embodiment form, the pressure medium connections S, P, R on the baseplate side and the pressure medium connections A, B on the working side are arranged opposite one another. In contrast to the general technical teaching of the invention which also embraces a two-surface L-shaped recess, there are in this case exactly two oppositely located surfaces in a U-shaped recess which are provided with pressure medium connections, wherein the third surface which is arranged essentially perpendicular to the opposing surfaces is provided for the electrical connection. The position of the third surface deep in the U-shaped recess produces a particularly dependable electrical contact. In addition, this contact point is also optimally protected against external mechanical influences.

In the L-shaped recess as well as in the special U-shaped recess, the corresponding pressure medium connections arranged at the baseplate element and at the valve element are brought into flush alignment by surface-wise displacement of these two elements relative to one another. That is, as the valve element is inserted the surface of the valve element with the pressure medium connection moves along the surface of the base plate element with the pressure medium connections until the respective pressure medium connections are aligned. The insertion movement of the valve element causes the connector to be plugged into the socket because these electrical connection means are arranged essentially perpendicular to the surface or surfaces with pressure medium connections.

The electrical connection advantageously comprises an electric line or conductor which exits from the valve drive and has a connector at its end and which is guided outward along the connection surface of the valve element, wherein the connector is fastened on the outside of the valve element by a fastening device such, for example, as a snap-in connection. Alternatively, the electrical connection may also be constructed in the form of a plurality of electrical lines or conductor running inside of the valve element, wherein, in addition to the integrated connector, there is also an electrical plug-in connection to the valve drive. In both cases, it is possible for the electrical line to be made of flexible cable or rigid punched bent metal parts or conductor paths produced by metallization.

The socket is preferably fastened to an electrical duct element which contains electrical lines or conductors and is detachably connected with the baseplate element. In the area of the connector and socket, the baseplate element has an opening enabling access for the connector and socket to be mechanically connected. The use of the electrical duct element allows the individual electrical lines leading to the control unit to be collected in a concealed manner. The electrical duct element is advantageously dimensioned with respect to width in such a way that a plurality of sockets for a corresponding plurality of valve elements with associated baseplate elements can be electrically connected to the control unit via one electrical duct element. A plurality of electrical duct elements arranged side by side may also be connected with one another via an electrical plug-in connection or metallized plastic plug-in elements or plastic paths, wherein an electrical bridge connection is provided internally.

In a preferred embodiment, the valve element to be inserted into the recess of the baseplate element is constructed in a wedge-shaped manner and the recess for receiving the same is constructed so as to be correspondingly wedge-shaped. This facilitates removal of the valve element from the recess of the baseplate element. For purposes of locking, the valve element may advantageously be detachably connected with the baseplate element by a snap-in connection or lock. To realize a pressure-tight connection between the valve element and baseplate element, elastic sealing elements may be arranged in the area of the corresponding pressure medium connections of the valve element and baseplate element.

A valve unit comprising the valve arrangements according to the invention may be wired in parallel to each of the valve arrangements in conventional manner or may also operate in a bus-controlled manner. In the latter case, at least one bus signal decoder chip is accommodated in the electrical duct element or in the control unit for converting the bus signals to switching signals for the valve drive.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 3 shows an alternative embodiment of a valve element of the valve arrangement of FIG. 2; and FIG. 4 shows another alternative embodiment of a valve element of the valve arrangement of FIG. 2.

DETAILED DESCRIPTION OF THE PRESENTLY PREFERRED EMBODIMENTS

Figure 1:
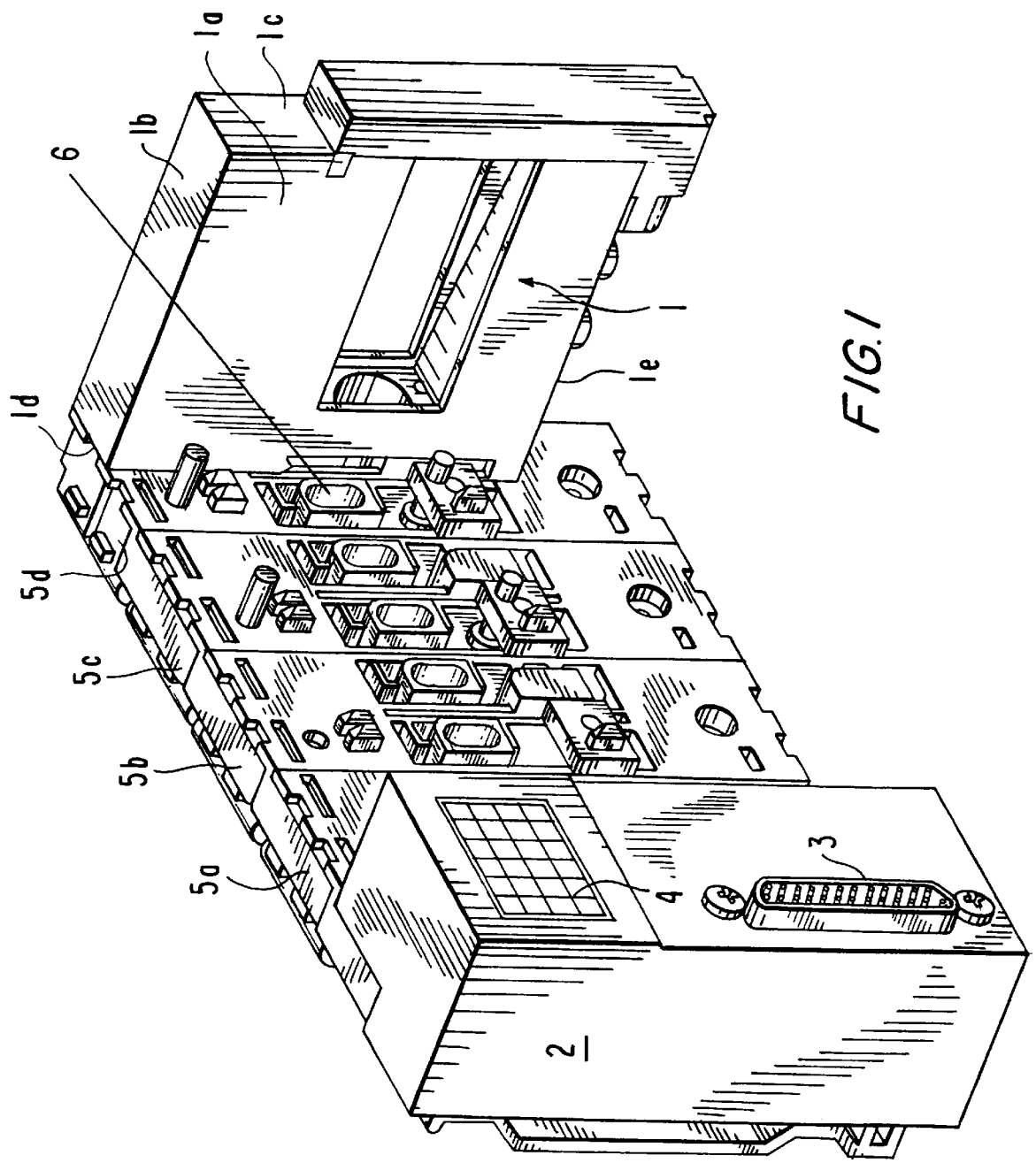
FIG. 1 is a perspective view of a partially assembled valve unit showing a schematic view of a valve arrangement according to an embodiment of the present invention.

According to FIG. 1, a valve unit 50 for receiving a plurality of side-by-side plate-shaped valve arrangements 1 (one of which is shown) includes a control unit 2 fitted with a multi-pin connector 3 for connecting the valve unit 50 to a central control, not shown. The control unit 2 has an optical display panel 4 allowing a user to monitor the operating state of the valve arrangements 1. The control unit 2 receives the control signals entering on the input side from an external source via the multi-pin connector 3 and conducts these control signals on the output side to the individual valve arrangements I which are arranged on plug-in locations formed by electrical duct elements 5a to 5d. In the embodiment shown in FIG. 1, each of the electrical duct elements 5a to 5d receives two valve arrangements I to be plugged in. Alternatively electrical duct elements 5a to 5d may also comprise single-plug modular electrical duct elements. Electrical connections running within the electrical duct elements 5a to 5d from the control unit 2 to electrical sockets 6 arranged at each plug-in location on the electrical duct elements 5a to 5d.

The valve arrangement 1 is plate-shaped or disc-shaped in that it has two opposing planar surfaces 1a with narrow sides 1b, 1c, 1d and 1e between the two surfaces.

Figure 2:
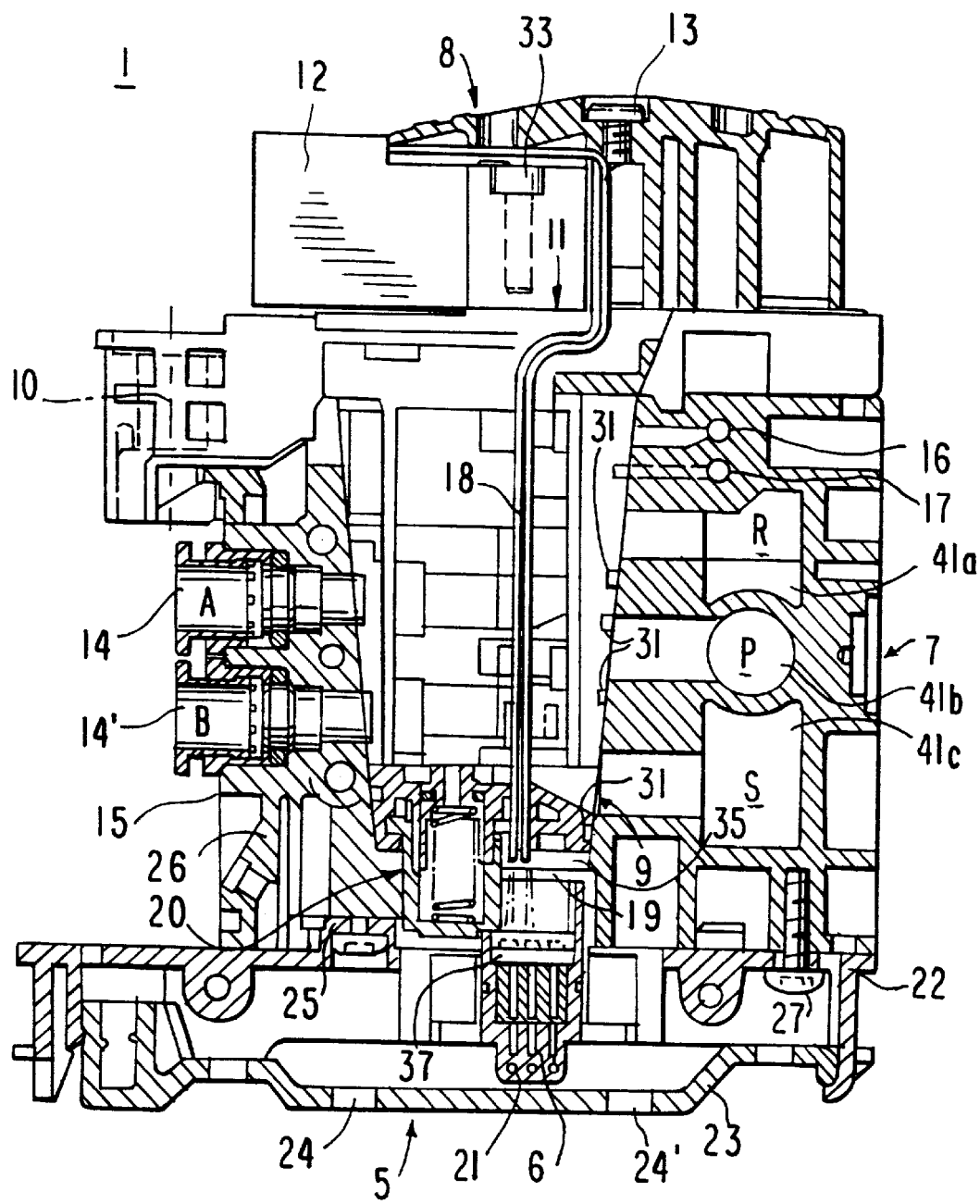
FIG. 2 is a longitudinal sectional view of a valve arrangement according to an embodiment of the present invention, including an electrical duct element, a baseplate element and a valve element.

Referring now to FIG. 2, the valve arrangement 1 includes a baseplate element 7 and a valve element 8 inserted in—i.e. plugged into—a U-shaped recess 9 in the baseplate element 7 and held there by a lockable snap-in connection 10. The valve element 8 has a valve drive 12 which is arranged at a controlling narrow side 11 (corresponding to narrow side 1c of FIG. 1) of the valve element 8 and which is freely externally accessible. The valve drive 12 is an electromagnetic pilot valve that is fastened to the valve element 8 by a screw connection 13. The valve drive 12 operatively causes a longitudinal displacement of a valve slide, not shown, within the valve element 8. As is known, the valve slide switches positions between pressure medium connections R, P, S on one side of the valve element 8 and pressure medium connections A, B on the other side of the valve element to selectively convey the pressure medium between the pressure medium connections. These pressure medium connections are arranged on opposing narrow sides of the valve element 8. The pressure medium connections R, P, S, A, B of the valve element 8 correspond to pressure medium connections R, P, S, A, B in the baseplate element 7 which are arranged at the two oppositely located surfaces of the recess 9. The pressure medium connections A, B in the baseplate element 7 open into pressure medium line connectors 14, 14' on a front endface 15 (corresponding to narrow side 1e in FIG. 1) of the baseplate element 7. The pressure medium line connectors 14, 14' are constructed as push-in fittings and receive working lines, not shown, which lead to a pressure medium unit—for example, a pneumatic cylinder—which is to be controlled by a pressure medium. The pressure medium connections R, P, S respectively open into pressure medium channel portions 41a, 41b, 41c which penetrate the plate-shaped baseplate element 7. Accordingly, when a plurality of valve arrangements 1 are arranged alongside each other in a row on the valve unit 50, a plurality of pressure medium channels R, P, S which supply and discharge all of the valve arrangements in common form a portion of the valve unit 50 by connection surfaces of the valve arrangements 1. The pressure medium connections are sealed from the atmosphere in the area of the connection surfaces via sealing elements 31. Although the sealing elements 31 are shown on the surfaces for the pressure medium connections R, P, S, they are also similarly present at the pressure medium connections A, B. Pressure medium channels 16, 17 provide the pneumatic connection to the valve drive 12 constructed as a pilot valve.

Electrical conductors 18 exit from the valve drive 12 to electrically connect the valve arrangement 1 to the valve unit 50 as follows. The electrical conductors 18 run externally along the valve element 8 and are outfitted at the ends with an electrical connector 19 arranged on a lower narrow side (corresponding to narrow side 1d of FIG. 1) which is arranged opposing the controlling narrow side 11 of the valve element 8. The electrical connector 19 may comprise a fastener such as a snap-fit connector 35 for mechanical connection to the valve element 8. Further, the connection of the electrical conductors 18 at the valve drive 12 may optionally comprise a plug-in connector 33. FIG. 2 shows the electrical conductors 18 as a flexible cable running externally along the outside of the valve element 8. However, the electrical conductors 18 may also be run internally as in FIGS. 3 and 4 and instead of a flexible cable, the electrical conductors may comprise rigid punched out metal parts 18' as shown in FIG. 3 or conductor paths 18" produced by metallization as shown in FIG. 4.

When the valve element 8 is fully inserted, the valve element is fastened in the baseplate element 7 via the snap-in connection 10. The electrical connector 19 engages an electrical socket 6 at a bottom surface of the U-shaped recess 9. The bottom surface is part of an electrical duct element 5 (one of the electrical duct elements 5a–5d of FIG. 1). The baseplate 7 has an opening in this area to enable contact between the electrical connector 19 and the electrical socket 6.

Electrical conductors 21 are gathered in the electrical duct element 5 and run to the control unit 2 (see FIG. 1) for connecting each electrical socket 6 to the control unit 2. The electrical duct element 5 includes a housing 22 which can be closed by a cover part 23. The cover part 23 of the housing 22 is provided with through-holes 24, 24' for fastening to a carrier part of the valve unit 50, not shown. Further, the housing part 22 includes a holding cam 25 cooperating with a lock 26 which is arranged in the baseplate element 7 and which is actuatable by a screwdriver. The electrical duct element 5 is fastened to the baseplate element 7 by a screw connection 27. The electrical conductors 21 may connect each electrical socket 6 in parallel to the control unit 2 or may comprise a bus connected to each of the electrical sockets. If the valve unit 50 operates in a bus controlled manner, a bus signal decoder chip 37 may be arranged in the electrical duct element 5 for converting the bus signal to a switching signal for the valve drive 12.

By inserting the valve element 8 into the recess 9 of the baseplate element 7 containing all of the pneumatic and electrical connections, the valve arrangement 1 according to the invention makes possible an effective assembly of valve elements 8 combined to form a valve unit, wherein a safe, reliable electrical and pneumatic connection is produced and the valve unit in its entirety achieves a compact appearance.

The invention is not limited by the embodiments described above which are presented as examples only but can be modified in various ways within the scope of protection defined by the appended patent claims.

I claim:

1. A plate-shaped valve arrangement for insertion in a plug-in valve unit having a controller, said plate-shaped valve arrangement comprising:

a baseplate element having at least two pressure medium channels with a narrow bottom side connectable to the plug-in valve unit and a narrow top side, said base plate element having a recess open at said narrow top side and having a bottom end at said narrow bottom side of said base plate element, said recess having pressure medium connections in respective communication with said pressure medium channels and a multi-pin electrical socket arranged at said bottom end of said recess connectable to the controller of the plug-in valve unit; and a valve element having a first end insertable into said recess to a fully inserted position, pressure medium connections corresponding to and connectable with said pressure medium connections on said recess when said valve element is in said fully inserted position, an electrically controllable valve drive connected at a second end of said valve element opposing said first end operable for selectively conveying a pressure medium through said valve between said at least two pressure medium channels, and a connector plug electrically connected to said valve drive and arranged at said first end of said valve element and said connector plug being mechanically and electrically connected with said socket when said valve element is in said fully inserted position.

2. The plate-shaped valve arrangement of claim 1, wherein said pressure medium connections on said valve element and recess are arranged on opposing surfaces for facilitating a straight-line guidance of pressure medium through said valve element, said recess comprising a three-surface U-shape in said baseplate element and correspondingly cooperating with said valve element such that said pressure medium connections arranged at two oppositely located surfaces of said recess are connectable flush against said pressure medium connections of said valve element.

3. The plate-shaped valve arrangement of claim 1, further comprising an electrical conductor connected to said valve drive and guided along said valve element to said connector plug at said first narrow end.

4. The plate-shaped valve arrangement of claim 1, further comprising an electrical conductor running inside said valve element from the connector plug to a plug-in connection at said valve drive.

5. The plate-shaped valve arrangement of claim 3, wherein said electrical conductor comprises one of a flexible cable, rigid punched bent metal parts, and conductor paths produced by metallization.

6. The plate-shaped valve arrangement of claim 1, further comprising an electrical duct element detachably connected to said baseplate element and containing electrical conductors connectable to the control element, said socket being fastened to said electrical duct element in an opening of said electrical duct element enabling a mechanical connection of said connector plug and said socket.

7. The plate-shaped valve arrangement of claim 1, wherein said valve element and said recess of said baseplate element are correspondingly wedge shaped.

8. The plate-shaped valve arrangement of claim 1, further comprising a lockable snap-in connection for detachably connecting said valve element to said baseplate element.

9. The plate-shaped valve arrangement of claim 1, further comprising elastic scaling elements arranged between said pressure medium connections of said valve element and said baseplate element.

10. The plate-shaped valve arrangement of claim 1, wherein said valve drive comprises an electromagnetic pilot valve.

11. The plate-shaped valve arrangement of claim 1, wherein said baseplate element comprises at least one pressure medium line connector exiting a front endface of said baseplate element between said bottom narrow end and said top narrow end, and wherein other ones of said pressure medium connections open into continuous pressure medium channel portions perpendicularly arranged relative to a longitudinal axis of said recess in said baseplate element.

12. The plate-shaped valve arrangement of claim 6, wherein said electrical duct element is dimensioned with respect to its width such that a plurality of sockets for a corresponding plurality of baseplate elements and associated valve elements are electrically connectable to said electrical duct element.

13. The plate-shaped valve arrangement of claim 6, wherein said electrical duct elements are arrangeable side by side in the plug-in valve unit.

14. The plate-shaped valve arrangement of claim 6, wherein said electrical duct element comprises at least one bus signal decoder chip for converting bus signals to switching signals for said valve drive.

* * * * *